(12) United States Patent
Xiang

(10) Patent No.: US 7,746,781 B1
(45) Date of Patent: Jun. 29, 2010

(54) METHOD AND APPARATUS FOR PRESERVING DATA IN A SYSTEM IMPLEMENTING DIFFSERV AND IPSEC PROTOCOL

(75) Inventor: Jing Xiang, Acton, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1101 days.

(21) Appl. No.: 10/611,392

(22) Filed: Jun. 30, 2003

(51) Int. Cl.
*H04L 1/00* (2006.01)
(52) U.S. Cl. ................................ 370/235; 370/394
(58) Field of Classification Search ................ 370/392, 370/389, 235, 230
See application file for complete search history.

(56) References Cited

U.S. PATENT DOCUMENTS

| | | | |
|---|---|---|---|
| 6,498,787 B1 * | 12/2002 | Yi et al. ........................ 370/328 |
| 6,839,327 B1 * | 1/2005 | Zavalkovsky et al. ....... 370/252 |
| 7,000,120 B1 * | 2/2006 | Koodli et al. .................. 713/1 |
| 7,017,175 B2 * | 3/2006 | Alao et al. .................... 725/105 |
| 7,020,143 B2 * | 3/2006 | Zdan ....................... 370/395.21 |
| 7,099,327 B1 * | 8/2006 | Nagarajan et al. ............ 370/394 |
| 7,161,924 B2 * | 1/2007 | Koo et al. ..................... 370/338 |
| 7,260,392 B2 * | 8/2007 | Kitchin ..................... 455/432.1 |
| 2004/0008711 A1 * | 1/2004 | Lahti et al. ................... 370/428 |

* cited by examiner

*Primary Examiner*—Ricky Ngo
*Assistant Examiner*—Chandrahas Patel
(74) *Attorney, Agent, or Firm*—Anderson Gorecki & Manaras LLP

(57) ABSTRACT

An improved method is described for providing Differentiated Services (Diffserv) traffic to a node in a network that implements a security method that discards duplicate packets received at the node. The method includes the step of identifying at least two service levels to be provided to received traffic and assigning separate sequential sequence numbers and different anti-replay bitmasks to each of the service levels. The anti-replay bitmask indicates the sequence numbers of packets that have been previously received at the node that should be compared against a received packet to determine whether a duplicate packet has been received. Such an arrangement reduces the possibility that traffic having lower priority is dropped as a security measure.

13 Claims, 6 Drawing Sheets

METHOD AND APPARATUS FOR PRESERVING DATA IN A SYSTEM IMPLEMENTING DIFFSERV AND IPSEC PROTOCOL

FIELD OF THE INVENTION

This invention relates generally to the field of networking and, more specifically, to the method for supporting quality of service issues in a secure network environment.

BACKGROUND OF THE INVENTION

As is known in the art, data is transferred between nodes over the Internet in the form of packets or datagrams. A packet typically consists of a header portion and a data portion. The data portion comprises a number of bytes or octets of data. There may be any minimum number of bytes in the data portion of the packet, but typical protocols also ensure that there is a maximum number of bytes of data that, are transferred between each packet header. Because packets may be transmitted through different routes in the network to a destination node, they may reach the destination node out of order. In certain protocols, such as the Internet Protocol Security (IPSEC) protocol, a sequence number field of an Authentication Header (AH) or Encapsulated Security Payload (ESP) is assigned to each packet to enable the destination node to reject duplicate packets.

Referring now to FIG. 1, an exemplary definition of fields of an Internet Protocol (IP) packet header includes a number of fields that control how the data associated with the header is to be treated at a source and destination node. Exemplary fields include the source address 12*j* and the destination address 12*k*, which include the IP addresses of the communicating nodes. In addition, the IP header includes a version field 12*a* which identifies which version of the IP protocol should be used when parsing the IP header, and a protocol field 12*h* which identifies what other protocols are layered on top of the IP protocol. For example, certain protocols such as Transmission Control Protocol (TCP) include their own header, and the encoding of the TCP protocol in the protocol field alerts the destination node to interpret a portion of the data as a TCP header.

Another field in the IP header is the Type Of Service (TOS) field 12*m*. In the IP protocol, the TOS identifies the quality of service that should be afforded a given transmission between the identified source and destination nodes. For example, for nodes that support Differentiated Services Protocol (Diffserv) the field may be encoded to indicate a relative priority of the transmission; high priority transmissions would be given precedence over low priority transmissions at DiffServ compliant nodes.

In version IPv4 and IPv6 of the IP protocol a replacement header field, called the Differentiated Services Code (DSCP) field 13, is defined, which supersedes the definition of the IP TOS octet. Differentiated Services (generally referred to as Diffserv by the art), enables different Per Hop Behaviors (PHBs) to be experienced at different nodes for different types of traffic. Traffic having a certain type of per hop behavior are said to belong to a particular behavior aggregate. Diffserv thus allows a network subscriber to control the quality of service (QOS) that is associated with their traffic by entering into a service level agreement to obtain the desired behavior of traffic at certain nodes. Generally speaking, there is a correlation between the value in the DSCP field and the per hop behavior desired for the data encapsulated in the data field of the corresponding packet, and the per hop behavior is the means by which a node allocates resources to the behavior aggregate. There can be a variety of different types of traffic between a common source and destination, each of which may have different per hop behaviors and therefore traffic might arrive out of order.

While there are many possible per hop behaviors, certain per hop behaviors have been defined in the art. These per hop behaviors include Best Effort Forwarding (BE), Assured Forwarding (AF) and Expedited Forwarding (EF).

Best Effort (BE) per hop behavior is the default per hop behavior of Diffserv. BE behavior aggregate packets may be sent into a network without adhering to any particular rules and the network will deliver as many of these packets as possible and as soon as possible, subject to other resource policy constraints. The reasonable implementation of this per hop behavior would be to forward packets in this aggregate whenever the output link is not required to satisfy another per hop behavior. A reasonable policy for constructing services ensures that the behavior aggregate was not starved by allowing some accesses to the resources.

Traffic that is forwarded as part of the Assured Forwarding (AF) behavior aggregate is forwarded with a high probability that it will reach the destination node as long as the aggregate traffic from each site does not exceed a subscribed threshold. For example, in a typical application, a company uses the Internet to interconnect its geographically distributed sites and wants an assurance that IP packets within this intranet are forwarded with high probability as long as the aggregate traffic from each site does not exceed the subscribed information rate (profile). Different levels of Assured Forwarding (AF) PHB group behavior may be offered by a service provider to meet the required bandwidth and cost associated with the customer.

Expedited Forwarding provides the highest Priority per hop behavior. The intent of the Expedited Forwarding PHB is to provide a building block for low loss, low jitter and low delay services. The dominant causes of delay in packet network are set propagation delays in wide area links and tuning delay in switching and routers. Since propagation delays are a set property of the topology, delay can be minimized when queuing delays are minimized. The intent of the expedited forwarding per hop behavior is to provide a behavior in which suitably marked packets usually encounter short or empty queues. If queues remain short relative to buffer space available, packet loss is also kept to a minimum.

A protocol that may be layered on top of the IP protocol is the Internet Protocol Security (IPsec) protocol. Internet Protocol Security (IPsec) is a security protocol that provides security services at the IP layer by enabling a system to select required security protocols, determine the algorithm(s) to use for services, and put in place any cryptographic keys required to provide the requested services. IPsec can be used to protect one or more paths between a pair of hosts, between a pair of secure gateways, or between a security gateway and a host. The set of security services that IPsec can provide include access control, connectionless integrity, data origin authentication, limited traffic flow confidentiality, and anti-replay checks (the rejection of replayed packets (a form of partial sequence integrity)).

IPsec uses two protocols to provide traffic security, Authentication Header (AH) and Encapsulating Security Payload (ESP). The IP Authentication Header is used to provide connectionless integrity and data origin authentication for IP datagrams, and to provide protection against replays. The ESP protocol may provide confidentiality (encryption) and limited traffic flow confidentiality. It also may provide connectionless integrity, data origin authentication, and an anti-replay service. The AH and ESP protocols may be applied alone or in combination with each other to provide a desired set of security services in IPv4 and IPv6.

IPsec offers, via AH or ESP protocol, a form of partial sequence integrity referred to as anti-replay integrity, which detects the arrival of duplicate. IP datagrams (or packets) within a constrained window to help counter denial of service (DoS) attacks. A DoS attack is a type of attack on a network that is designed to bring the network to its knees by flooding it with useless traffic. Many DoS attacks, such as the Ping of Death and Teardrop attacks, exploit limitations in the TCP/IP protocols. The anti-replay mechanism seeks to overcome DoS attacks by assigning the sequence number of received packets, and dropping any packets having duplicate sequence numbers within a predefined window.

FIG. 2 illustrates a defined format of an Authentication Header 14 and an Encapsulated Security Payload 16 for purposes of illustrating the sequence number field. As shown in FIG. 2, the sequence number (15d or 17d) comprises 32 bits, and is used in the generation of an anti-replay bitmask for data packets associated with the secure transmission. In, order to prevent DoS attacks, the anti-replay mechanism rejects packets having duplicate sequence numbers within a thirty-two packet window.

Referring now to FIG. 3, an exemplary Diffserv data flow is shown, wherein the IP packets may have layered thereon an Authentication Header for IPsec purposes, including sequence numbers. A first traffic stream is shown to include packets A1, A2 and A3, and a second traffic stream is shown to include packets B1, B2, B3. Source node 20 transmits both traffic streams to destination node 30. In the example of FIG. 3, assume that data transmission A, comprising packets A1, A2 and A3 are packets comprising the BE PHB aggregate, and transmission B, comprising packets B1, B2 and B3 are packets comprising an EF PHB aggregate. Source node 20 initiates the transmission of traffic stream A over the Internet 25 by forwarding packets A1 and A2 to destination node 30. As the packets are transmitted, they are assigned sequence numbers 1 and 2 respectively. Subsequent to the transmission of packets A1 and A2, data traffic belonging to the Expedited Forwarding per hop behavior aggregate is received at the source node 20. To implement the EF PHB for traffic stream B, the source node immediately substitutes the traffic stream B in its transmissions to destination node 30. Packet B1 is assigned sequence number 1, packet B2 is assigned sequence number 2, and packet B3 is assigned sequence number 3, and all packets are forwarded to the destination node. Following the transmission of packet B3 to the destination node, the final packet A3 of the first transmission can be forwarded to the destination node.

A problem arises, however, at the destination node due to the anti-replay mechanism of the IPsec protocol, because when packet B1 and B2 (sequence number of 1 and 2) is received at the destination node it will be dropped since it is out of the 32 bitmask (last packet's sequence number is 36). It would be desirable to determine a method of implementing Diffserv in networks having nodes operating using the IPsec protocol.

SUMMARY OF THE INVENTION

An improved method is described for providing Differentiated Services (Diffserv) traffic to a node in a network that implements a security method that discards duplicate packets received, at the node. The method includes the step of identifying at least two service levels to be provided to received traffic and assigning separate sequential sequence numbers and different anti-reply bitmasks to each of the service levels. The anti-reply bitmask indicates the sequence numbers of packets that have been previously received at the node that should be compared against a received packet to determine whether a duplicate packet has been received. Such an arrangement reduces the possibility that traffic having lower priority is dropped as a security measure.

DESCRIPTION OF THE PREFERRED EMBODIMENT

A method and apparatus for supporting differentiated services (Diffserv) traffic at nodes that implement redundant packet discard security measures to prevent Denial Of Service (DoS) attacks will be described with reference to the attached Figures and below specification.

Figure 5:
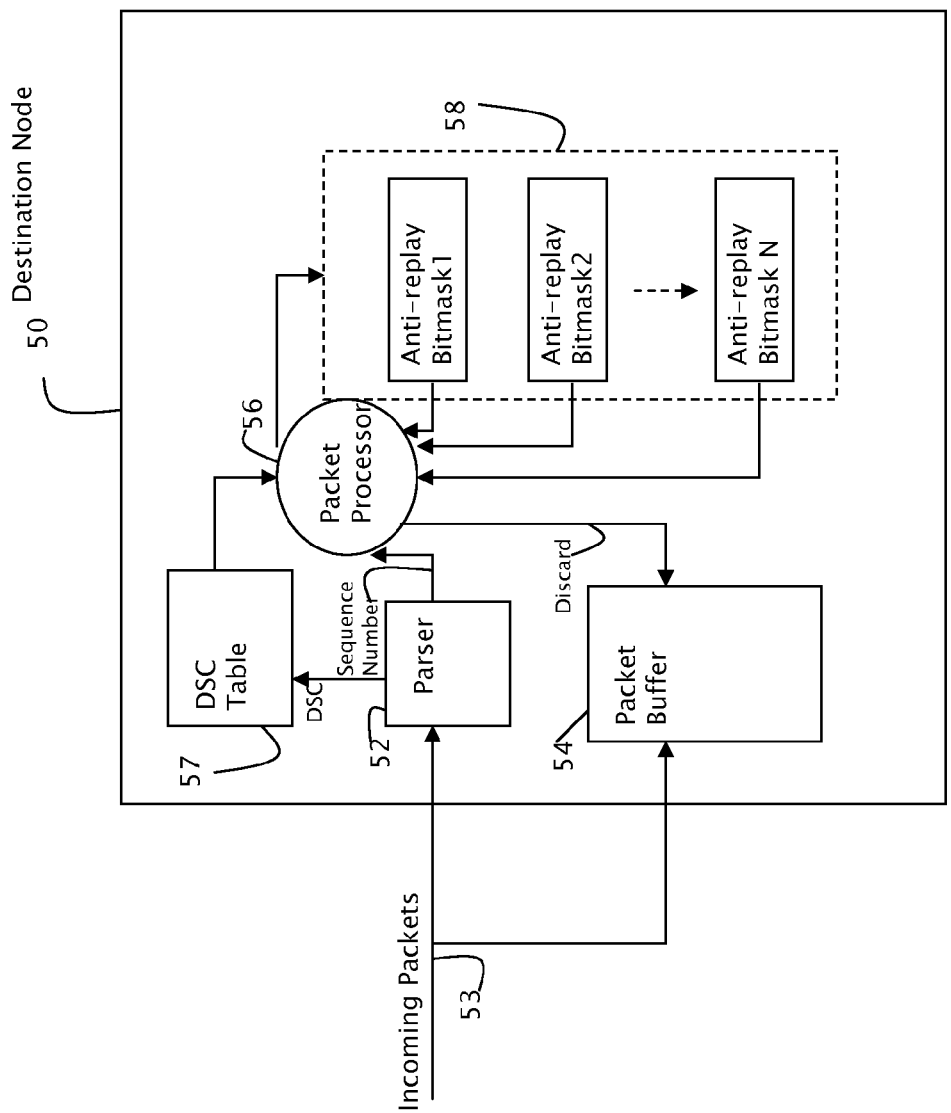
FIG. 5 is a conceptual block diagram of certain components that may be included in hardware or software at a host node, operating according to the present invention.

Referring now to FIG. 5, some basic components of a networked node 50 are shown to include a packet processor 56, a parser 52 and a packet buffer 54. Although the components are shown as functional blocks, it should be understood that the functionality described with regard to each of the components may be implemented in either software, hardware, or a combination thereof, and the present invention is not limited to any specific implementation. In general, the networked node receives incoming packets on line 53, and forwards the packets, for temporary storage in the packet buffer 54. The packet processor 56, among other things, determines whether the packet stored in the buffer should be forwarded to memory (not shown) for further processing or to an output path (not shown) of the node. In addition, the packet processor sends signals to the packet buffer if it is determined that the packet should be discarded. The focus of the present invention will be specifically on the redundant packet discard security measure that is often performed to minimize DoS attacks at a node. One example of a redundant packet discard security measure is the anti-replay mechanism of the Internet Protocol Security (IPsec) protocol, particularly the Authentication Header (AH) protocol and/or Encapsulating Security Protocol (ESP) of the IPsec protocols. It should be understood that although the present invention is described with regard to certain elements of the IPsec protocol, the present invention is not limited to operation under any specific protocol. Rather, it can be implemented in any system that maintains sequence numbers for the purposes of dropping duplicate fragments.

Figure 1:
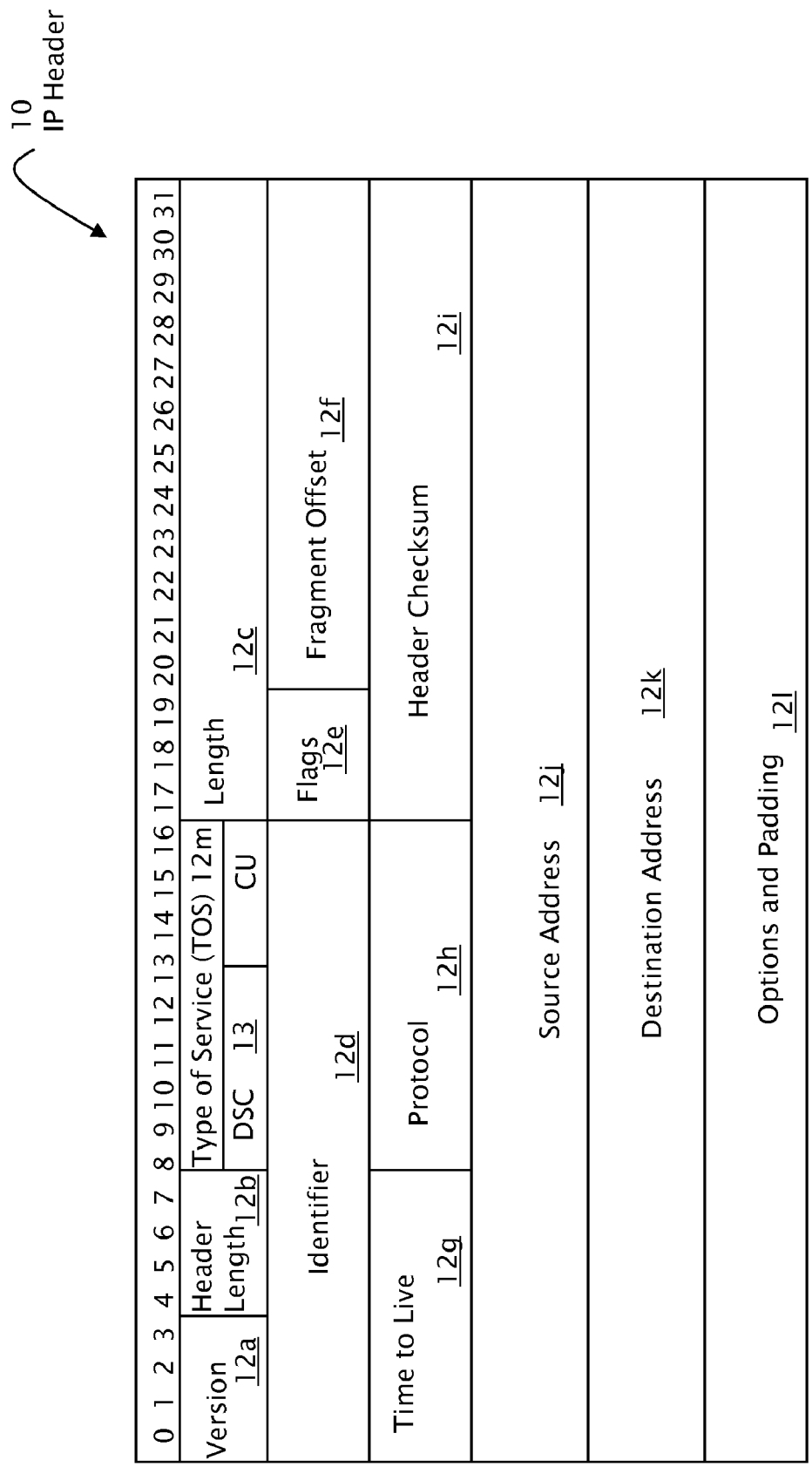
FIG. 1 is a diagram illustrating various fields of a header according to the Internet Protocol.
Figure 2:
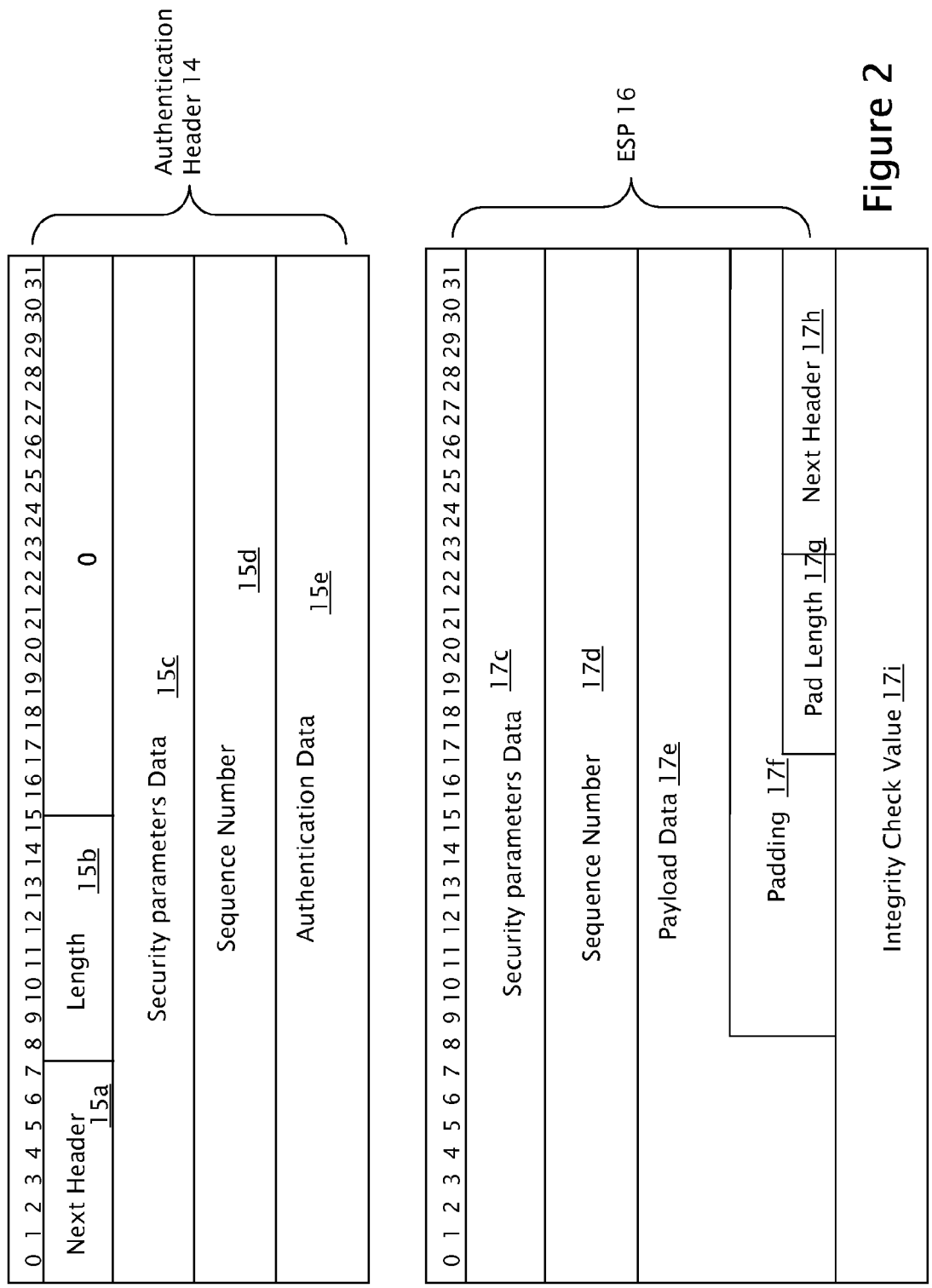
FIG. 2 is a diagram illustrating various fields that are included in, a packet transmitted using Internet Protocol Security (IPSec) protocol packet, including an Authentication Header (AH) and an Encapsulating Security Payload (ESP)
Figure 3:
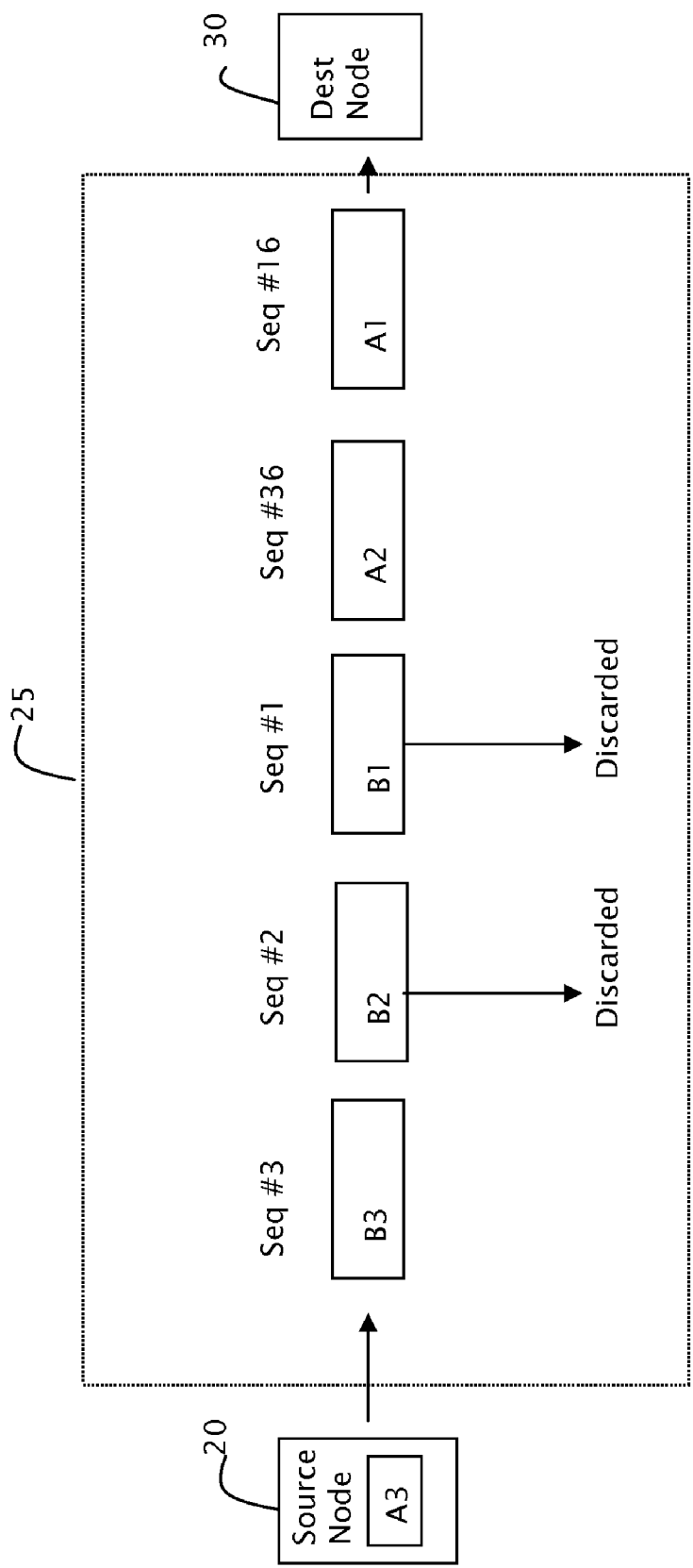
FIG. 3 is a packet flow diagram for illustrating how packets that are part of Diffserv traffic are frequently dropped at nodes operating using the anti-replay mechanism of the IPsec protocol.
Figure 4:
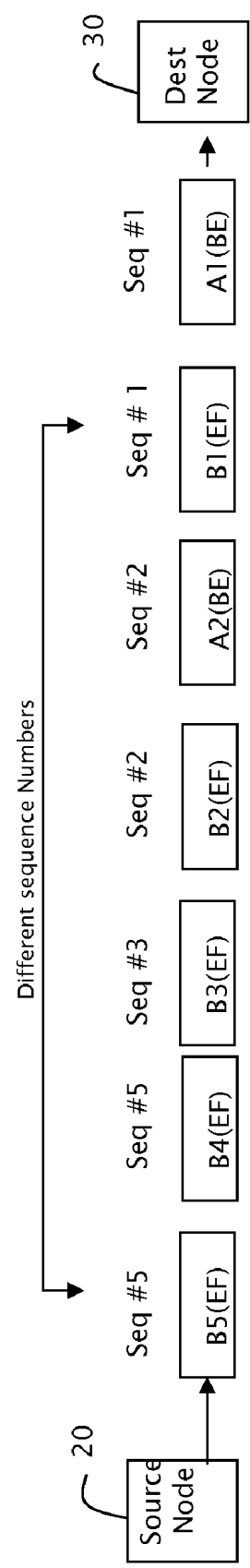
FIG. 4 is a packet flow diagram for illustrating how assigning separate sequence numbers to different service levels according to the present invention overcomes the problems of the prior art illustrated in FIG. 3.

According to one aspect of the invention, sequence numbers are assigned to packets sequentially within their provided service level or per hop behavior. This differs from the prior art, where the sequence numbers were assigned in order to transmitted packets without regard to their determined PHB. Assigning sequence numbers according to the packet's PHB can reduce the instance of discarding of packets as shown in FIG. 4. FIG. 4 uses the same example of FIG. 3, but sequence numbers are assigned sequentially within each PHB, rather than merely sequentially from the transmitter. With this improvement, the packet B5 is no longer viewed as a potential DoS attack since the sequence number is not a duplicate, and therefore it is not discarded that the receiver.

According to a second aspect of the present invention, each Per Hop Behavior has a separate associated anti-replay bitmask, representing sequence numbers associated with the Per Hop Behavior that were received during a predetermined window, (such as a thirty two packet window). Each anti-replay bitmask is associated with a defined per hop behavior aggregate, such as Best Effort (BE), one of a set of Assured Forwarding (AF) per hop behaviors, Expedited Forwarding (EF) or the like. When an input packet is received at the node, the DSCP field is parsed from the IP header and forwarded to the Diffserv codepoint (DSCP) table 57 to determine the contracted level of service associated with the traffic stream. There is a correlation between the DSCP and the per hop behavior, although it may not be a one-to-one mapping, and other considerations, such as the type of packet as indicated in the identifier field 12*d* of the IP header, the IP addresses of the source and destination nodes, the protocol associated with the specific packet (as identified in field 12*h*), and other factors may be used to map the packet to one of a set of per hop behavior (PHB) aggregates. The present invention recognizes that there may be many PHBs defined from many input fields of the packet, and the present invention should not be limited to any specific PHBs or methods for determining PHB aggregates. The alternative term of 'service level' will be used interchangeably hereinafter with the term per hop behavior aggregate.

Referring now to FIG. 5, logic at the node 50 operates generally as follows. When a packet is received at the node, the parser 52 strips the DSCP field and the sequence number from the respective IP and AH/ESP headers. The DSCP field is used to obtain a portion of the per hop behavior mapping information, which is forwarded to the packet processor. The packet processor retrieves the anti-replay bitmask for the PHB from the bitmask table 58. The packet processor compares the anti-replay bitmask, which incorporates the sequence numbers of previous packets received within the PHB window, to the current sequence number to find a match. If a match is found within this window or the packet falls out of the PHB window, the current packet is discarded because it is a potential DoS attack. If no match is found, the packet is processed in accordance with the remaining fields of the IP header.

Figure 6:
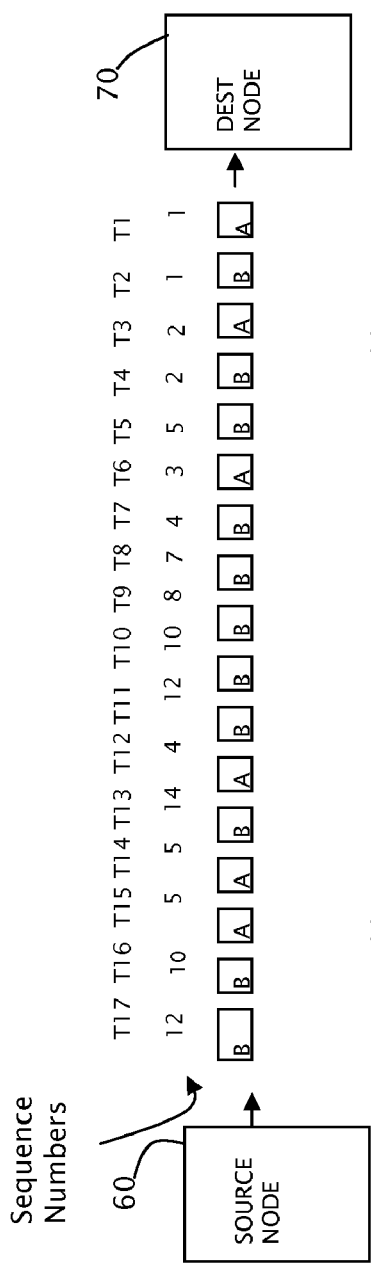
FIG. 6 is a packet flow diagram for illustrating how offering separate sequential sequence numbers and differing anti-replay bitmasks according to the present invention reduces the instances of discard of Diffserv packets in systems operating under the IPsec protocol.

For example, referring now to FIG. 6, assume that a node is implementing a security protocol that drops duplicate packets, but that the traffic that flows through the network is Diffserv traffic having a variety of service levels. Using known Diffserv terminology, assume that the traffic includes packets having Expedited Forwarding (EF) service levels, and a default Best Effort (BE) service level Data traffic having EF service level has sequence number of 1; 2, 3, 4, 5 etc., and data having BE service level has sequence number of 1, 2, 3, 4, 5 etc.

In FIG. 6, source node 60 is transmitting a series of traffic streams A and B to destination node 70. In FIG. 6, assume that traffic stream A has Expedited Forwarding service level and traffic stream B has Best Effort Forwarding service level.

To illustrate the operation of the present invention, assume that traffic flows as expected from source to destination, and at time T16 there is the first replicated sequence number within a given traffic flow. That is, a packet of traffic stream B is received with the same sequence number (one) that was provided with the packet of traffic stream B received at time T2.

As mentioned previously, in this example traffic stream B is an assured forwarding PHB stream. Table II illustrates the contents of an anti-replay bitmask for stream B at time T16. Note that only those entries associated with stream B have values in the bitmask field for the associated FIFO. The value of the anti-replay bitmask at time T16 is determined by ORing the previously received sequence numbers within the window, to provide a result of 101011011011 (indicating that sequence number 1, 2, 4, 5, 7, 8, 10, 12 was received). The received sequence number in T16 is 0000001, and thus there is not a match at the receiver, and packet B will not be discarded. Note that the bitmask at time T16 for stream A differs from that of Stream B, as it considers only sequence numbers associated with traffic stream A.

It should be noted that the example implementation of FIG. 6, including anti-replay window sizes, FIFOs, etc, is presented merely for purposes of illustrating the present invention, and should not be viewed as limiting the invention in any manner. Rather, it should be understood that the sizes of windows associated with service level offerings, or the choice of hardware or software to implement the above concepts is a matter of design choice.

Thus, a method and apparatus has been shown and described wherein sequence numbers are assigned to packets based on both the class of the packet (i.e., the PHB or service class associated with the packet) as well as the relative sequential order of the packet. In addition, separate anti-replay masks are maintained for each class of traffic. Although a window size of five is described above, it is known that current IPsec protocol uses a window size of thirty two packets for anti-replay protection. The present invention is not limited to any particular anti-replay window size, nor is it limited to all Per Hop behaviors having the same PHB. It is envisioned that in some embodiments, PHBs of higher priority may have smaller anti-replay windows than those with higher priority. In addition, the present invention is not limited to any particular PHB. As is known, the DSCP field of the IP header comprises enough bits to support sixty-four different PHBs. The present invention can be provided to support anti-replay mechanisms for any number of PHBs in a system, where the number selected may depend upon the available space for buffering anti-replay bitmasks, etc. By providing the separate sequence numbers and the individual bit masks for each class of service, potentially erroneous packet discards resulting from incorrectly diagnosed DoS attacks are minimized.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications.

What is claimed is:

1. An apparatus comprising:

means for receiving a plurality of packets having an associated plurality of sequence numbers, wherein each one of the packets in the plurality of packets has a quality of service level associated therewith, and wherein there are at least two types of service levels;

a first look-back window of a first size for packets associated with a first service level;

a second look-back window of a second size for packets associated with a second service level, wherein the first look-back window is different than the second look-back window and the first size is different than the second size and the first service level is different than the second service level;

means for comparing, for each received packet, a received sequence number of each received packet against a set of previously received sequence numbers, wherein the set of sequence numbers includes only sequence numbers of packets previously received within a look-back window associated with a quality of service level type corresponding to the quality of service level type of the received packet and wherein a number of previously received sequence numbers for each set differs for at least two quality of service levels because the first size is different than the second size; and means for discarding the received packet in the event of a match between the received sequence number and any of the sequence numbers in the set of sequence numbers in the look-back window of the same quality of service level type.

2. A method for determining whether to discard a received packet at a node, the method including the steps of:

establishing a first look-back window of a first size for packets associated with a first service level;

establishing a second look-back window of a second size for packets associated with a second service level, where the first look-back window is different than the second look-back window and the first size is different than the second size and the first service level is different than the second service level;

comparing a sequence number associated with a first received packet against sequence numbers associated with a selected number of previously received packets in the first look-back window, the selected number determined by the first size, wherein the first received packet has a quality of service level associated therewith, the wherein the selected number of previously received packets are of the same quality of service level as the first received packet;

comparing a sequence number associated with a second received packet against sequence numbers associated with a selected number of previously received packets in the second look-back window, the selected number determined by the second size, wherein the second received packet has a quality of service level associated therewith that differs from the first received packet, and wherein the selected number of previously received packets are of the same quality of service level as the second received packet, whereby the selected number of previously received packets examined in the step of comparing differs for at least two quality of service levels;

discarding the first received packet in the event of a match between any one of the sequence numbers associated with the previously received packets in the first look-back window and the sequence number associated with the first received packet; and discarding the second received packet in the event of a match between any one of the sequence numbers associated with the previously received packets in the second look-back window and the sequence number associated with the second received packet, whereby the number of sequence numbers compared with the sequence number of the first received packet differs from the number of sequence numbers compares with the sequence number of the second packet.

3. The method according to claim 2, further comprising forwarding the received packet for processing in the event that there is no match between any one of the sequence numbers associated with the selected number of previously received packets having the same quality of service as the received packet and the sequence number of the received packet.

4. The method according to claim 2 further comprising forwarding the received packet for processing in the event that the received packet is received a predetermined time after the selected number of previously received packets.

5. The method of claim 2, wherein the quality of service level is determined in response to a differentiated services codepoint (DSCP) associated with the packet.

6. The method according to claim 3, wherein at least one of the quality of service levels corresponds to a Best Efforts (BE) per hop behavior.

7. The method according to claim 3, wherein at least one of the quality of service levels corresponds to an Expedited Forwarding (EP) per hop behavior.

8. The method according to claim 3, wherein at least one of the quality of service levels corresponds to an Assured Forwarding (AF) per hop behavior.

9. An apparatus for discarding redundant packets received at a receiving node, comprising:

a sequence number buffer, for storing sequence numbers associated with packets received at the receiving node, wherein a packet is assigned a sequence number responsive to a quality of service level of the packet and a sequence number of a prior packet having the quality of service level of the packet;

a first look-back window of a first size for packets associated with a first service level;

a second look-back window of a second size for packets associated with a second service level, wherein the first look-back window is different than the second look-back window and the first size is different than the second size and the first service level is different than the second service level;

an anti-replay bitmask table including a first entry associated with the first look-back window and a second entry associated with the second look-back window, each entry associated with a different quality of service level and storing the bitmask of sequence numbers of previously received packets to be compared in determining whether to discard a received packet, wherein a number of sequence numbers of previously received packets that are compared differs for at least two quality of service levels because the first size is different than the second size.

10. The apparatus of claim 9, wherein one of the entries of the anti-replay bitmask table is associated with an Expedited Forwarding (EF) service level.

11. The apparatus of claim 9, wherein one of the entries of the anti-replay bitmask table is associated with an Assured Forwarding (AF) service level.

12. The apparatus of claim 9, wherein one of the entries of the anti-replay bitmask table is associated with a Best Effort (BE) service level.

13. The apparatus of claim 9, wherein the apparatus operates according to an Internet Protocol Security (IPsec) protocol.

\* \* \* \* \*